(12) United States Patent
Zentner et al.

(10) Patent No.: US 7,390,413 B2
(45) Date of Patent: Jun. 24, 2008

(54) WATER SOFTENER SYSTEM AND METHOD

(75) Inventors: Martin M. Zentner, Prospect, KY (US); Scott Tarr, Louisville, KY (US); Jessica Schroeder, Oshkosh, WI (US); James Cosgrove, La Grange, KY (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 11/290,009

(22) Filed: Nov. 30, 2005

(65) Prior Publication Data

US 2007/0119784 A1 May 31, 2007

(51) Int. Cl.
*C02F 1/42* (2006.01)
(52) U.S. Cl. .................. 210/670; 210/764; 210/177; 210/190
(58) Field of Classification Search ............... 210/670, 210/637, 764, 177
See application file for complete search history.

(56) References Cited

U.S. PATENT DOCUMENTS

| | | | |
|---|---|---|---|
| 3,454,492 A | 7/1969 | Gaines | |
| 3,768,649 A | 10/1973 | Fleckenstein | |
| 3,899,421 A | 8/1975 | Keilin et al. | |
| 4,257,887 A | 3/1981 | Rak et al. | |
| 4,320,010 A | 3/1982 | Tucci et al. | |
| 4,341,636 A * | 7/1982 | Harder et al. | ............... 210/670 |
| 4,814,090 A | 3/1989 | Kunz et al. | |
| 4,889,041 A | 12/1989 | Mahlich et al. | |
| 4,893,422 A | 1/1990 | Mahlich et al. | |
| 4,917,794 A | 4/1990 | Fettes et al. | |
| 6,103,125 A * | 8/2000 | Kuepper | ............... 210/637 |

* cited by examiner

*Primary Examiner*—Walter D. Griffin
*Assistant Examiner*—Cameron J Allen
(74) *Attorney, Agent, or Firm*—George L. Rideout, Esq.; Armstrong Teasdale LLP (57) ABSTRACT a water softening system includes a water softening resin tank, an anion resin tank in flow communication with the water softening resin tank, an in-line water heater in flow communication with the water softening resin tank and a heat exchanger in flow communication with the in-line heater. A water heater is in flow communication with the heat exchanger and the in-line heater. A plurality of flow control valves are operatively connected to the water heater heat exchanger, in-line water heater, anion resin tank, and water softening resin tank. The flow control valves are configured to control the flow of water through the water softening system.

14 Claims, 8 Drawing Sheets

WATER SOFTENER SYSTEM AND METHOD

BACKGROUND OF THE INVENTION

This invention relates generally to water treatment systems, and, more particularly, to in-home water softener systems water softener systems.

Water treatment devices are generally used to treat water in a home or building for human consumption. At least some other known water treatment devices include a water softener assembly for removing hardness minerals from the water. At least some known water treatment devices include a filter for filtering particles or sediment from the water. In addition, at least some known water treatment devices include taste and odor filters for reducing chlorine or odor causing material from the water. At least some other known water treatment devices include mercury and lead filters for removing mercury and lead from the water. Moreover, in at least some filtration systems, a common filter head and sump is used with multiple filter media designed particular filtration objectives. Furthermore, at least some other known water treatment devices include disinfection devices for removing, killing or inactivating microorganisms such as bacteria, virus, cysts, protozoa, and the like from the water.

However, consumers typically purchase specific individual components to assemble an array of water treatment devices that are specific to water quality concerns of consumers. Each individual component in the array, functions independently from the other components, thus increasing the difficulty of maintaining the overall water treatment system in the consumers home or building. Additionally, consumers may also perform certain maintenance functions such as the timely replacement of filter media.

BRIEF DESCRIPTION OF THE INVENTION

In one aspect, a water softening system includes a water softening resin tank, an anion resin tank in flow communication with the water softening resin tank, an in-line water heater in flow communication with the water softening resin tank and a heat exchanger in flow communication with the in-line heater. A water heater is in flow communication with the heat exchanger and the in-line heater. A plurality of flow control valves are operatively connected to the water heater heat exchanger, in-line water heater, anion resin tank, and water softening resin tank. The flow control valves are configured to control the flow of water through the water softening system.

In another aspect, a method for regenerating a Thermally Regenerative Resin (TRR) in a water softening system by operating the water softening system in a regenerating mode. The regenerating mode includes channeling water from a storage tank through a heat exchanger to a hot water heater, channeling water from the hot water heater to an in-line heater, channeling water from the in-line heater to a TRR resin tank in a direction counter to the direction of flow in a normal softening mode, channeling water from the TRR resin tank to a heat exchanger and then to an anion resin tank in a direction counter to the direction of flow in a normal softening mode, and bypassing the hot water when a temperature at the heat exchanger is substantially equal to a design output temperature of the hot water heater.

DETAILED DESCRIPTION OF THE INVENTION

Figure 1:
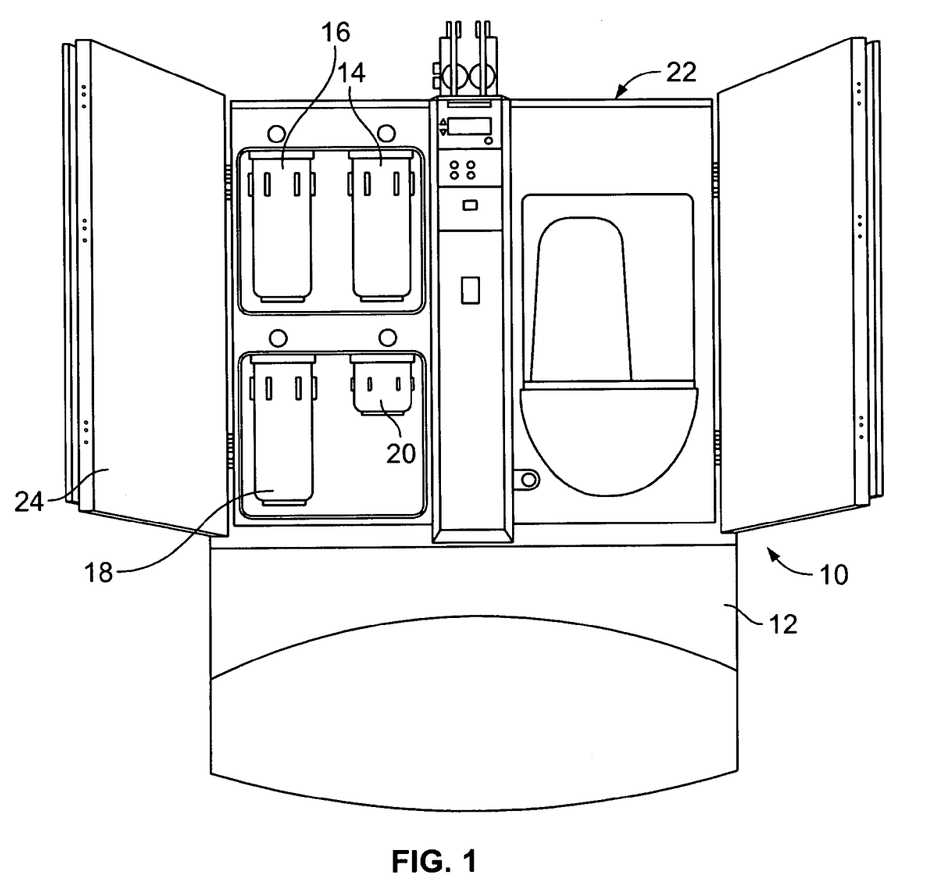
FIG. 1 is a front view of an exemplary water treatment assembly.

FIG. 1 is a front view of an exemplary water treatment assembly 10. Water treatment assembly 10 includes a housing or cabinet 12 enclosing a plurality of water treatment elements, or modules, therein. In the exemplary embodiment, water treatment assembly 10 includes a particle filter module 14 including at least one particle or sediment filter (not shown) for gross particle reduction. Assembly 10 also includes a taste and odor removal module 16 including a taste and odor filter (not shown) and a lead and mercury removal module 18 including at least one lead and mercury filter (not shown). In an alternative embodiment, water treatment assembly 10 includes less than all, or a combination of, modules 14, 16 and 18. In the exemplary embodiment, assembly 10 includes at least one additional modular compartment 20 to facilitate housing additional filter modules depending on the users particular water quality needs. Modular compartment 20 includes a by-pass sump and may be upgraded with a module similar to the other modules previously described. Alternatively, water treatment assembly 10 includes multiple modular compartments 20 that may be upgraded at a later date or in response to a determined water quality after installation of assembly 10. In the exemplary embodiment, assembly 10 includes a water softener sub-assembly 22.

Assembly 10 includes doors 24 hingedly mounted to housing 12. Doors 24 allow access to the plurality of water treatment elements. In the exemplary embodiment, doors 24 include a latch to retain doors 24 in a closed position. It is to be understood that the present invention is applicable, not only to water treatment assemblies which form a stand alone device, such as water treatment assembly 10, but to other forms of water treatment assemblies as well, such as, but not limited to, central water treatment systems. Therefore, water treatment assembly 10 is provided by way of illustration rather than limitation, and accordingly there is no intention to limit application of the present invention to any particular water treatment assembly, such as water treatment assembly 10.

Figure 2:
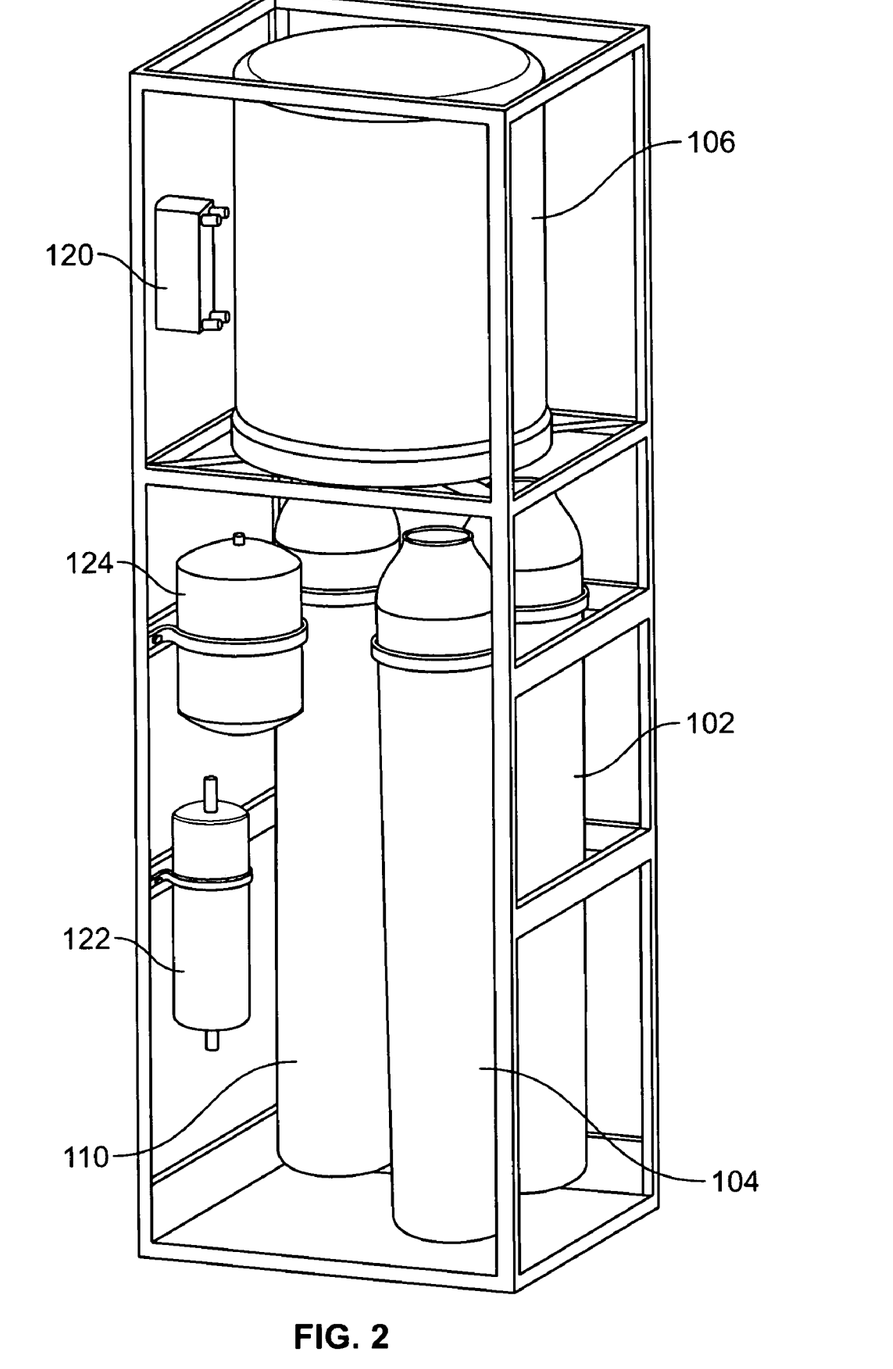
FIG. 2 is a perspective view of an exemplary water softener system.

FIG. 2 illustrates an exemplary water softening system 100 that may be included in water treatment assembly 10. In FIG. 2, plumbing lines and valves have been deleted for clarity. Additionally, housing panels have also been omitted. Water softening system 100 includes a TRR resin tank 102, an anion resin tank 104, a water heater 106 and a storage tank 110. Water softening system 100 is a salt free system. That is, TRR resin tank 102 contains a Thermal Regenerative Resin (TRR). The TRR resin is regenerated using hot water rather than a brine solution. TRR resins are known in the art and at least one suitable TRR resin is produced by the Novation Company. Anion resin tank 104 is provided to remove certain contaminants such as bicarbonates that may be harmful to the TRR resin in TRR resin tank 102. Water heater 106 is dedicated to the water softening system 100 and does not provide hot water to the home or building. Storage tank 110 is provided to store some of the water that is heated during the regeneration cycle. Water from the storage tank 110 is used during the next regeneration cycle, thus reducing energy costs. During regeneration, water is heated to a temperature of about one hundred ninety degrees Fahrenheit.

Water softening system 100 also includes a heat exchanger 120, an in-line heater 122 and a pump 124. Also included but not shown in FIG. 2 are plumbing lines for interconnecting the various components and control valves for controlling water flow between the components. Heat exchanger 120 is provided to recapture heat from waste water. Both heat exchanger 120 and in-line heater 122 supplement water heater 106 to reduce the energy required by water heater 106.

Figure 3:
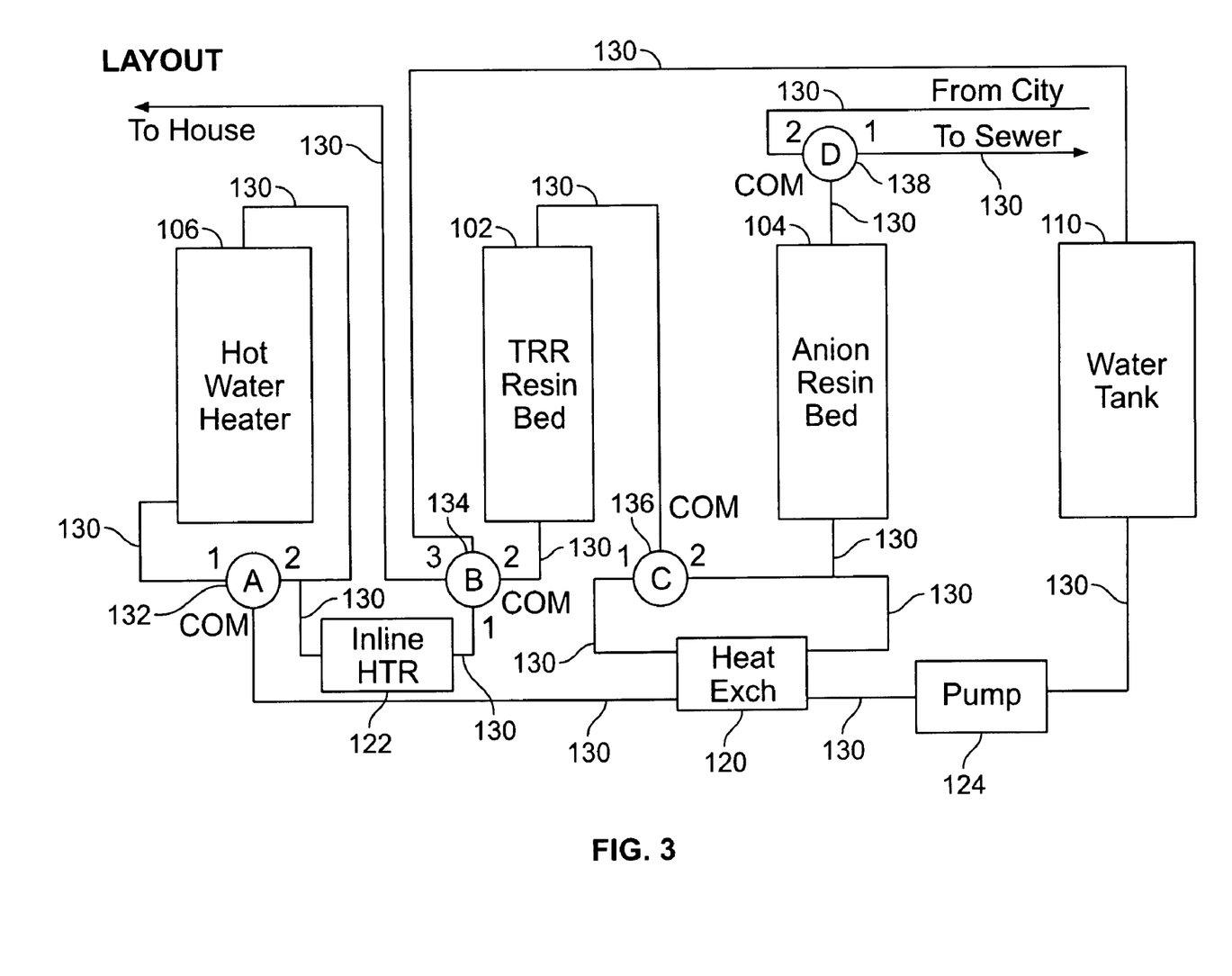
FIG. 3 is a schematic view of an exemplary water softening system.

FIG. 3 illustrates an exemplary schematic view of water softening system 100. A plurality of plumbing lines 130 interconnect the various components of the water softening system 100. Water softening system 100 includes flow control valves 132, 134, 136, and 138 that control the flow of water to and from the various components. As will be more specifically described, valve 132 controls the flow of water into water heater 106. Valve 134 controls the flow of water to and from TRR resin tank 102. Valve 136 controls the flow of water to TRR resin tank 102, and valve 138 controls the flow of water to anion tank 104.

Figure 4:
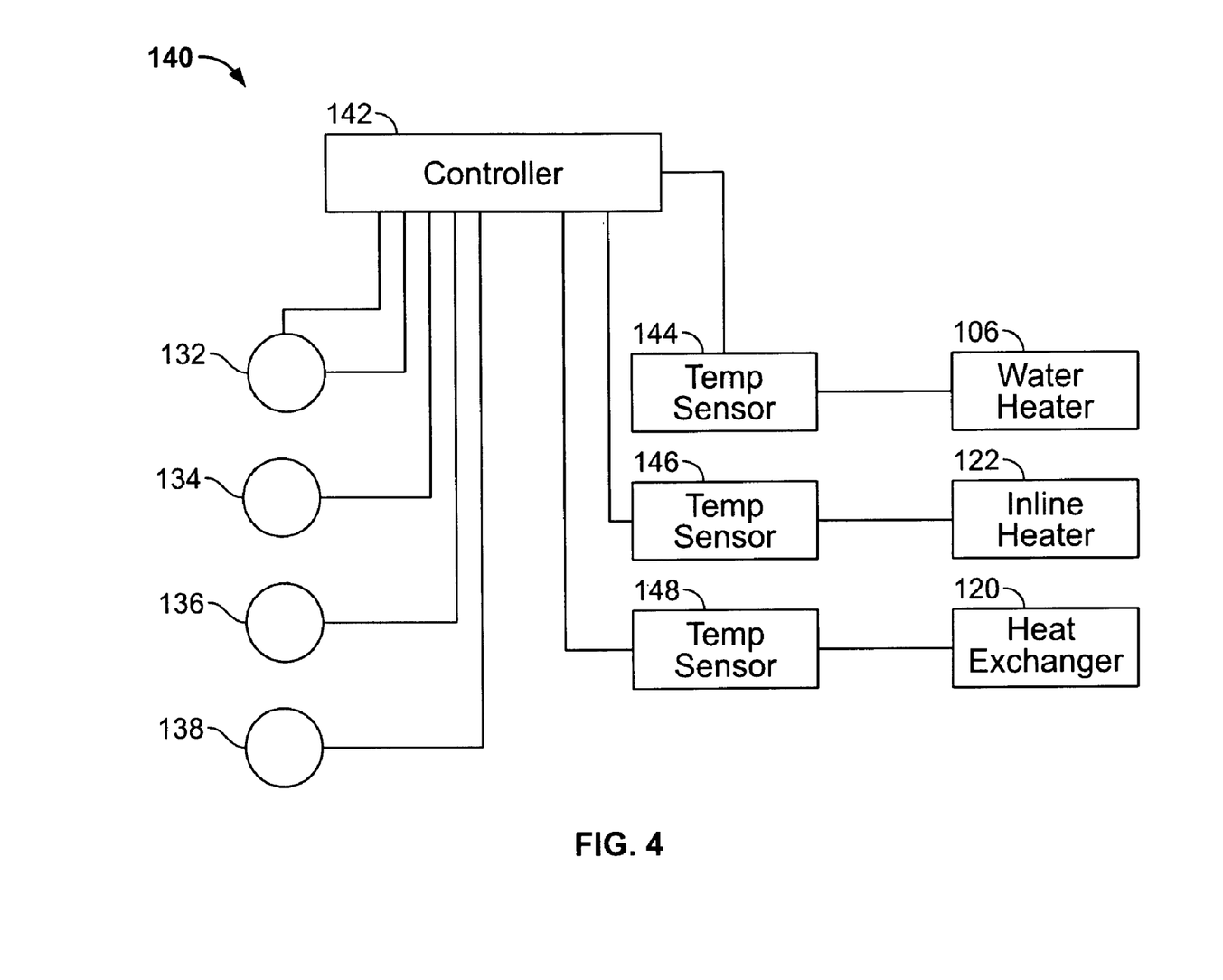
FIG. 4 is a schematic view of a control system for controlling the water softening system shown in FIG. 3.

FIG. 4 illustrates a schematic view of a control system 140 that controls the operation of water softening system 100. Control system 140 includes a controller 142 that is operatively coupled to valves 132, 134, 136, and 138. A temperature sensor 144 monitors the outlet temperature of water heater 106 and communicates a signal to controller 142 based thereon. Temperature sensor 146 monitors the inlet and outlet temperatures of in-line heater 122 and communicates signals to controller 142 based thereon. Similarly, temperature sensor 148 communicates signals to controller 142 based on inlet and outlet temperatures of heat exchanger 120. Controller 142 controls valves 132, 134, 136, and 138 based on the temperature signals from sensors 144, 146, and 148.

Figure 5:
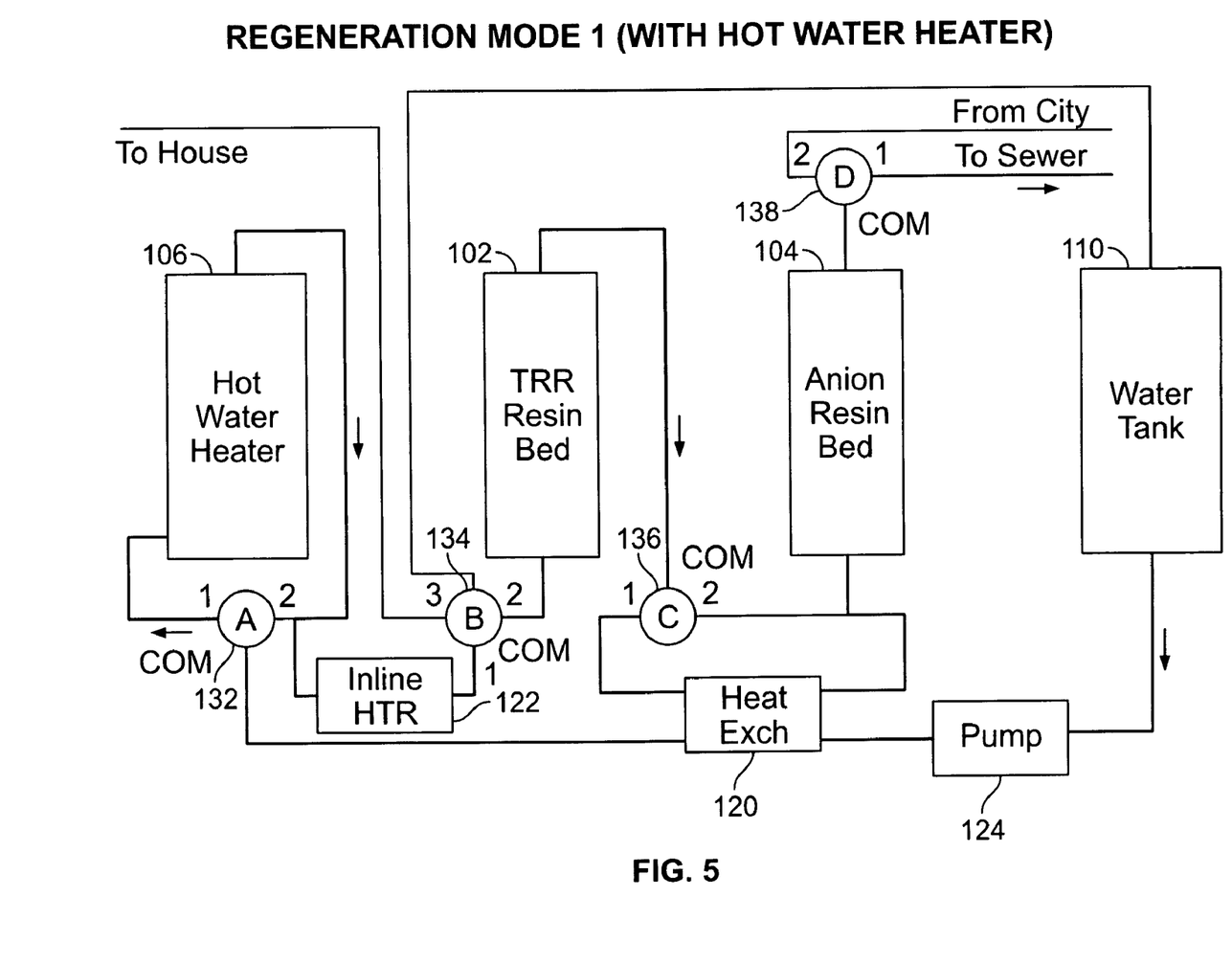
FIG. 5 is a schematic view of the water softening system shown in FIG. 3 in a regeneration mode 1.

FIG. 5 is a schematic view of water softening system 100 in a first phase or mode of a regeneration cycle. In the first regeneration mode, pump 124 draws water from storage tank 110 and channels water to heat exchanger 120 and on the water heater 106. At the start of the regeneration cycle, none of the water in the system is sufficiently hot to regenerate the TRR resin in TRR resin tank 102. Consequently, water heater 106 is relied upon to heat the water in the system. In an exemplary embodiment, water heater 106 is designed to heat the water to an outlet temperature of about one hundred sixty degrees. In-line heater 122 is designed to boost the temperature of water from water heater 106 about thirty degrees from one hundred sixty degrees to about one hundred ninety degrees at which temperature, the TRR resin in TRR resin tank 102 can be regenerated. During the warm up period, heat exchanger 120 operates to warm the water going to water heater 106 to shorten the warm up time for the system. Warm up time as well as the overall regeneration time is also influenced by the flow rate of water through the system. In one embodiment, water softener system 100 operates efficiently at a flow rate of from 0.25 to 0.5 gallons per minute.

As the first mode progresses, water heater outlet temperature increases to the design temperature of one hundred sixty degrees and in-line heater boosts the water temperature to one hundred ninety degrees and regeneration of the TRR resin in TRR resin tank 102 begins. As the first mode continues, the outlet temperature of heat exchanger 120 approaches the outlet temperature of water heater 106. Notably, water flow through TRR resin tank 102 and anion resin tank is counter to the direction of water flow when water softener system 100 is in the softening mode. Discharged waste water is channeled through valve 138 to a sewer line.

Figure 6:
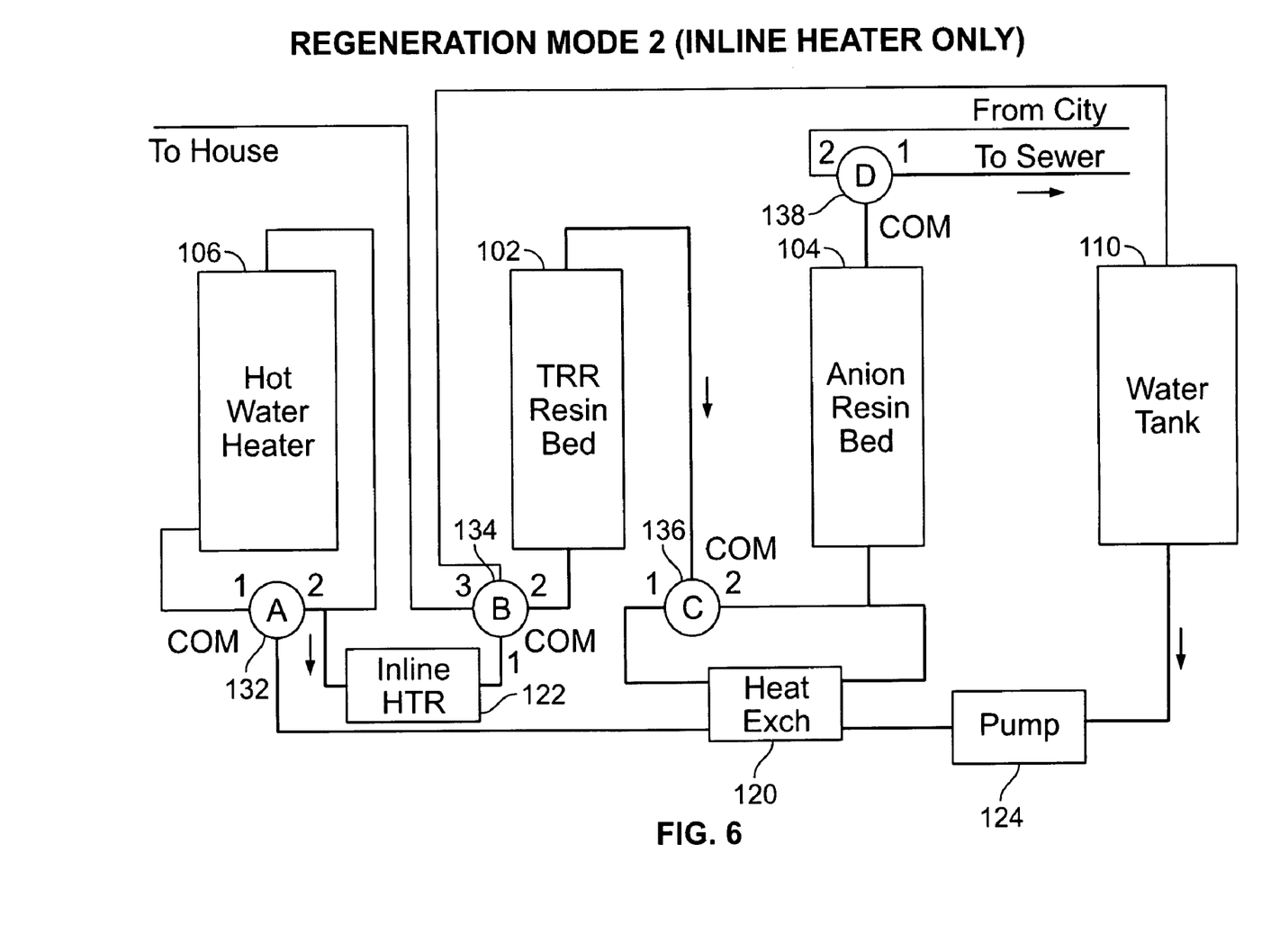
FIG. 6 is a schematic view of the water softening system shown in FIG. 3 in a regeneration mode 2.

FIG. 6 is a schematic view of water softening system 100 in a second phase or mode of a regeneration cycle. When the outlet temperature of heat exchanger 120 reaches the design outlet temperature of water heater 106, which in one embodiment is one hundred sixty degrees, controller 142 operates valve 132 to channel water from heat exchanger 120 directly to in-line heater 122, bypassing water heater 106. Controller 142 also turns off the power to water heater 106. When water heater 106 is bypassed, energy is saved. In the second regeneration mode, regeneration of the TRR resin in TRR resin tank 102 continues. The anion resin in anion tank 104 is regenerated by chlorine or chloride ions released from the TRR resin. Controller 142 maintains the second regeneration mode for a predetermined time period. The predetermined time period is a time period that is sufficient to complete the regeneration of the TRR resin.

Figure 7:
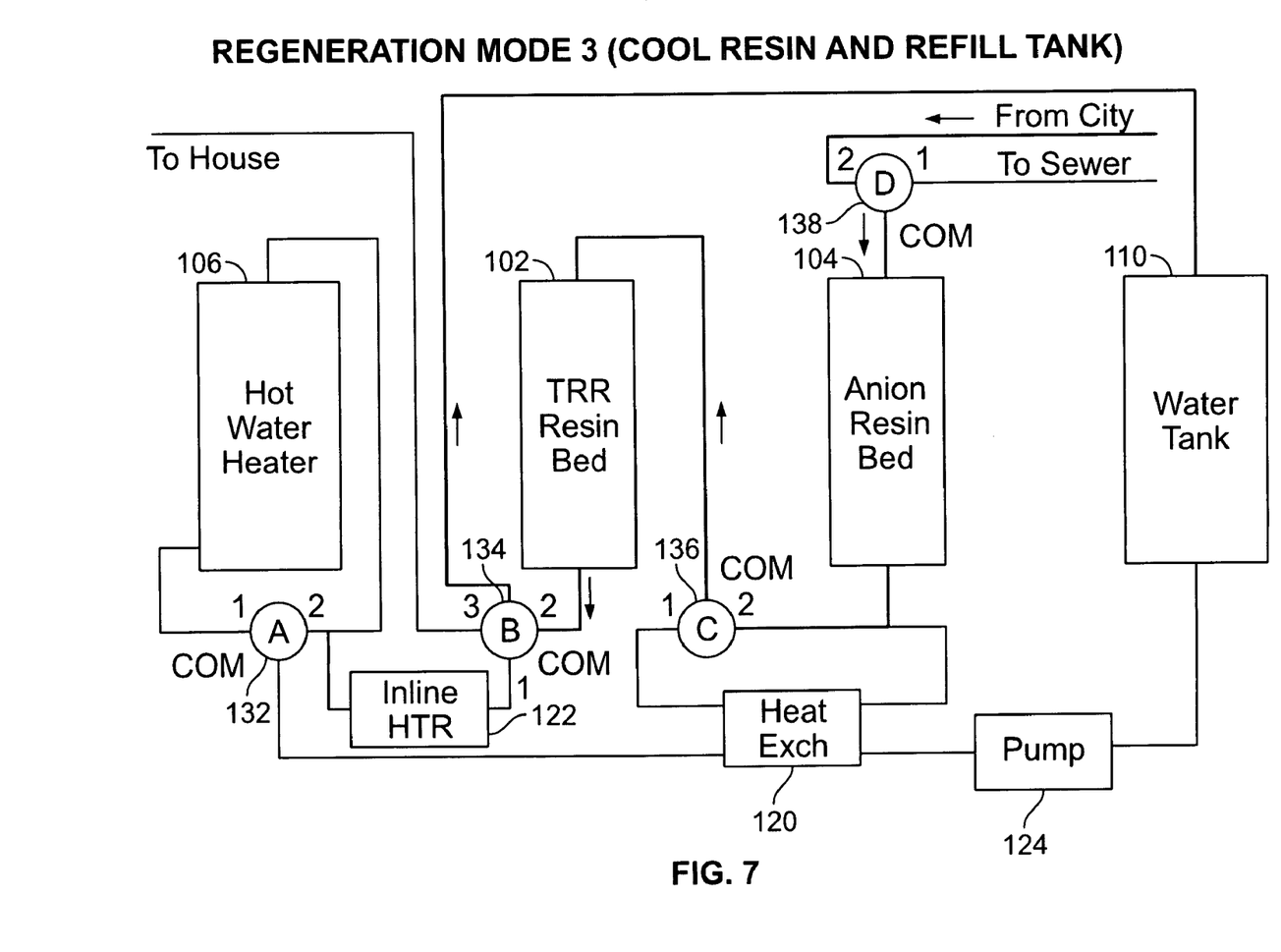
FIG. 7 is a schematic view of the water softening system shown in FIG. 3 in a regeneration mode 3.

FIG. 7 is a schematic view of water softening system 100 in a third phase or mode of a regeneration cycle. In the third mode, regeneration of the TRR resin is completed. Water from the city service line is channeled into water softener system 100 to cool the TRR and anion resins. Controller 142 operates valves 136 and 138 to channel cooling water into TRR resin tank 102 and anion tank 104 in the normal softening direction. Valve 134 is controlled to channel water from TRR resin tank 102 to storage tank 110, replenishing storage tank 110 with warm water.

Figure 8:
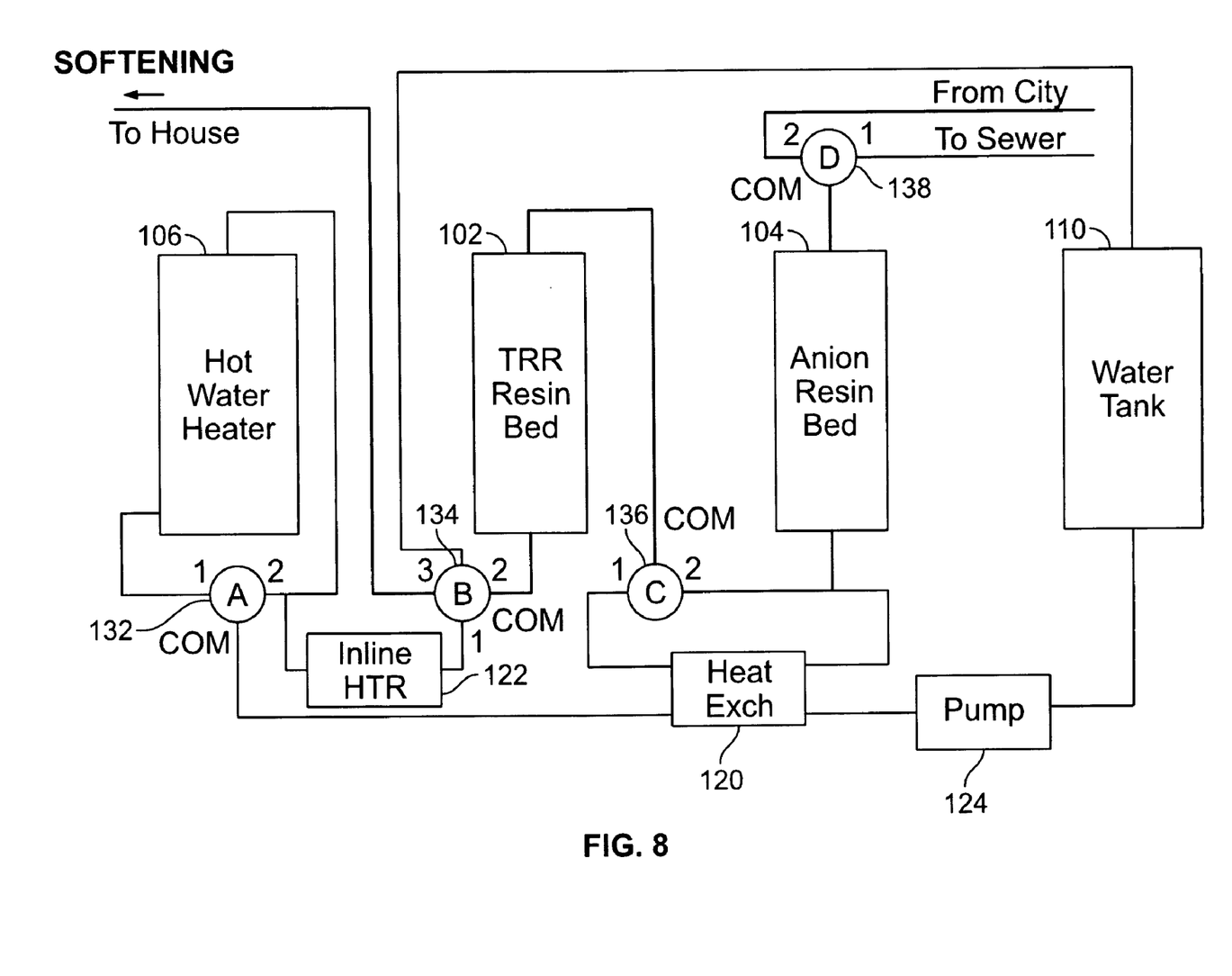
FIG. 8 is a schematic view of the water softening system shown in FIG. 3 in a normal softening mode.

FIG. 8 is a schematic view of water softening system 100 in a normal softening mode. In the normal softening mode, valves 134, 136, and 138 are controlled to channel water from the city service line through anion tank 104 and TRR resin tank 102 and then through valve 134 which is controlled to channel softened water to the home or building.

The above-described assembly provides a water softening system based on a TRR resin that can be cost-effectively operated in a residential environment. The system includes a heat exchanger and an in-line heater and is controlled to facilitate reducing operating costs by bypassing and turning off power to the water heater when the heat exchanger and the in-line heater can sustain the regeneration process. The system includes a plurality of sensors and flow control valves. The valves are controlled by a controller based on the temperature sensor signals.

Exemplary embodiments of a water softening systems are described above in detail. The system is not limited to the specific embodiments described herein, but rather each component may be utilized independently and separately from other components described herein. Each component can also be used in combination with other water softening assemblies.

While the invention has been described in terms of various specific embodiments, those skilled in the art will recognize that the invention can be practiced with modification within the spirit and scope of the claims.

What is claimed is:

1. A water softening system comprising:
   a water softening resin tank;
   an anion resin tank in flow communication with said water softening resin tank;
   an in-line water heater in flow communication with said water softening resin tank;
   a heat exchanger in flow communication with said in-line heater;

a dedicated water heater in flow communication with said heat exchanger and said in-line heater, said water heater configured to heat water to a first temperature and said in-line water heater configured to heat the water to a second temperature greater than the first temperature to facilitate conserving energy; and a plurality of flow control valves operatively connected to said water heater, heat exchanger, in-line water heater, anion resin tank, and water softening resin tank, said flow control valves configured to control the flow of water through said water softening system.

2. A water softening system in accordance with claim 1 wherein said valves are controllable to bypass said water heater when a temperature at said heat exchanger is approximately the same as an outlet temperature of said water heater.

3. A water softening system in accordance with claim 1 further comprising a storage tank in flow communication with said plurality of control valves.

4. A water softening system in accordance with claim 3 wherein said storage tank provides water during a regeneration cycle.

5. A water softening system in accordance with claim 3 wherein said storage tank is refilled when a regeneration cycle is completed.

6. A water softening system comprising:

a water softening resin tank;

an anion resin tank in flow communication with said water softening resin tank;

an in-line water heater in flow communication with said water softening resin tank;

a heat exchanger in flow communication with said in-line heater;

a water heater in flow communication with said heat exchanger and said in-line heater;

a plurality of flow control valves operatively connected to said water heater, said heat exchanger, said in-line water heater, said anion resin tank, and said water softening resin tank, said plurality of flow control valves configured to control the flow of water through said water softening system; and a controller and a plurality of temperature sensors, each of said plurality of temperature sensors providing a signal to said controller indicative of a water temperature in said water softening system.

7. A water softening system in accordance with claim 6 wherein said controller is configured to control said plurality of valves based on the signals from said plurality of sensors.

8. A water softening system in accordance with claim 1 wherein said water softening system is operable in a first mode wherein said water heater provides heated water to said in-line heater during a portion of a regeneration cycle.

9. A water softening system in accordance with claim 1 wherein said water softening system is operable in a second mode wherein said water heater is bypassed during a portion of a regeneration cycle.

10. A water softening system in accordance with claim 1 wherein said water softening system is operable in a third mode wherein cooling water is passed through said water softening resin tank and said anion resin tank during a portion of a regeneration cycle.

11. A water softening system in accordance with claim 1 wherein said water softener resin tank includes a Temperature Regenerative Resin (TRR) resin.

12. A water softening system in accordance with claim 1 wherein a flow rate through said water softening system is controlled to from about 0.25 gallons per minute to about 0.5 gallons per minute during a regeneration cycle.

13. A water softening system in accordance with claim 1 wherein said water softening system includes a water softening mode wherein water is channeled to said anion resin tank prior to said water softening tank.

14. A water softening system in accordance with claim 1 wherein said anion resin tank is configures to remove at least bicarbonates from water channeled to said anion resin tank.

* * * * *